United States Patent
Clothier et al.

(10) Patent No.: US 7,478,749 B2
(45) Date of Patent: Jan. 20, 2009

(54) FOOD PREPARATION SYSTEM

(75) Inventors: Brian L. Clothier, Wichita, KS (US);
Amil J. Ablah, Wichita, KS (US);
Richard Cabak, McKinney, TX (US)

(73) Assignee: Thermal Solutions, Inc., Wichita, KS (US)

( * ) Notice: Subject to any disclaimer, the term of this patent is extended or adjusted under 35 U.S.C. 154(b) by 493 days.

(21) Appl. No.: 11/061,345

(22) Filed: Feb. 18, 2005

(65) Prior Publication Data

US 2005/0256774 A1    Nov. 17, 2005

Related U.S. Application Data

(60) Provisional application No. 60/571,885, filed on May 17, 2004, provisional application No. 60/613,199, filed on Sep. 27, 2004.

(51) Int. Cl.
*G06K 15/00* (2006.01)

(52) U.S. Cl. ......................................... 235/383; 222/52
(58) Field of Classification Search ................. 235/383; 426/33; 222/52, 63
See application file for complete search history.

(56) References Cited

U.S. PATENT DOCUMENTS

| | | | |
|---|---|---|---|
| 4,919,950 A * | 4/1990 | Mak | 426/233 |
| 6,051,070 A | 4/2000 | Sunter | |
| 6,232,585 B1 | 5/2001 | Clothier | |
| 6,237,750 B1 | 5/2001 | Damkjaer | |
| 6,303,165 B1 * | 10/2001 | Karner | 426/231 |
| 6,320,169 B1 | 11/2001 | Clothier | |
| 6,561,022 B1 | 5/2003 | Doyle | |
| 6,564,999 B1 * | 5/2003 | Saveliev et al. | 235/383 |
| 6,838,873 B2 | 1/2005 | James | |
| 2003/0052166 A1 * | 3/2003 | Nguyen | 235/383 |
| 2005/0061195 A1 * | 3/2005 | Lutz et al. | 104/290 |

* cited by examiner

*Primary Examiner*—Daniel A Hess
(74) *Attorney, Agent, or Firm*—Hovey Williams LLP (57) ABSTRACT

A food preparation system and method that partially automates the ordering, preparation, and delivery of food items such as pizza. The food preparation system broadly comprising an ordering or point-of-sale station, a computing device, a conveyor system, at least one food preparation station, at least one heating station, a transfer station, a delivery station including at least one delivery device, and an entry/exit station.

15 Claims, 3 Drawing Sheets

FIG. 1.

FOOD PREPARATION SYSTEM

RELATED APPLICATIONS

The present application is a nonprovisional patent application and claims priority benefit, with regard to all common subject matter, of earlier-filed U.S. provisional patent applications titled "AUTOMATED INDUCTION BASED COOKING CONVEYOR SYSTEM," Ser. No. 60/571,885, filed May 17, 2004, and "RFID-EQUIPPED CONVEYOR SYSTEM ALLOWING PARTIALLY-AUTOMATED FOOD PREPARATION AND DELIVERY METHOD," Ser. No. 60/613,199, filed Sep. 27, 2004. The identified earlier-filed provisional applications are hereby incorporated by reference into the present application.

BACKGROUND OF THE INVENTION

1. Field of the Invention

The present invention relates to food preparation systems and methods. More particularly, the invention relates to a radio frequency identification device (RFID) equipped conveyor system and method for at least partially automating the order-taking, preparation, and delivery of food products.

2. Description of the Prior Art

Prior art methods of ordering, preparing, and delivering food products in restaurants, cafeterias, and other food establishments are inefficient and labor-intensive. For example, a waitress or cashier typically takes a customer's order and transfers it to a handwritten order form or one printed by a cash register. The order is then either manually carried or electronically transferred to a kitchen or other food preparation area. A cook or other food preparer then reads the order, prepares one or more food items to fulfill the order, and then places the food items in a designated pickup area. The food is then given to the customer by the cashier, carried to the customer's table by the waitress, or delivered to the customer's home via a delivery person. Those skilled in the art will appreciate that these primarily manual steps increase the costs and decrease the throughput of food establishments, especially those that serve a high volume of customers. Such manual steps also often result in mistakes in the ordering, preparation and/or delivery of food items.

Many types of conveyors and ancillary apparatus used to apply food ingredients to substrates moving along the conveyors have been disclosed in the prior art to alleviate some of the above-described problems. For example, U.S. Pat. No. 6,051,070 entitled "APPARATUS FOR APPLYING MATERIALS TO SUBSTRATES" describes machinery that can deposit a prescribed amount of ingredients to a substrate such as a pizza base. U.S. Pat. No. 6,237,750 entitled "TRANSPORT BAND FOR CONVEYING ALONG A SPIRAL PATH" by Damkjaer, et al. even describes conveyors that allow for non-linear motion. However, these systems still require a great deal of manual intervention and therefore only partially solve the problems discussed above.

SUMMARY OF THE INVENTION

The present invention more effectively solves the above-described problems and provides a distinct advance in the art of food preparation systems and methods. More particularly, the present invention provides a food preparation system and method that partially automates the ordering, preparation, and delivery of food items such as pizza to provide labor efficiencies and other efficiencies heretofore not found in restaurants and other food establishments. Use of the present invention also greatly reduces or even eliminates human mistakes and other errors in the ordering, preparation and delivery of food items.

One embodiment of the present invention is a food preparation system broadly comprising an ordering or point-of-sale station, a computing device, a conveyor system, at least one food preparation station, at least one heating station, a transfer station, a delivery station including at least one delivery device, and an entry/exit station.

The ordering station includes a register for receiving order information from a customer and an RFID reader/writer having at least one antenna. The order information may include, for example, the quantity and type of ordered food products, the name and address of the customer to whom the food should be delivered, and the time and date of desired delivery.

The computing device is coupled with the register and is operable for receiving at least some of the order information and for creating food preparation instructions related to the order. For example, the food preparation instructions may include a list and quantity of ingredients needed to complete the order and assembly and cooking instructions for the ingredients. The computing device may be a central computer located remotely from the ordering station or may be integral to the register.

The conveyor system is provided for receiving and conveying food items through various stations to complete a food order and includes a track and at least one car movable along the track. The track is positioned so as to carry the car to the ordering station, the food preparation station, the heating station, and the transfer station. Each car includes a food-supporting platform for building a food item or vessel which contains a food item and an RFID tag operable for receiving and storing at least some of the order information from the ordering station and at least some of the food preparation instructions created by the computing device.

Each food preparation station includes an RFID reader/writer for reading at least some of the food preparation instructions from the car's RFID tag and a prompter for prompting a food preparer to add at least one food item to the car in accordance with at least one of the food preparation instructions. For example, the prompter may be a video screen which displays those food preparation instructions which can be carried out at the particular food preparation station to prompt a food preparer at the station to follow the displayed food preparation instructions.

Each heating station is provided for heating and/or cooking the food item or food-holding vessel carried by the car. The food preparation system may include one or more induction cooktops, a conventional oven, and/or other conventional heating and cooking devices suited for the particular restaurant or other establishment in which the present invention is used.

The transfer station is provided for transferring the food items from the cars to the delivery devices. The transfer station includes an RFID reader/writer for reading at least some of the order information from the memory on the cars.

The delivery station includes an RFID reader/writer coupled with the RFID reader/writer of the transfer station for transferring the order information read from a car to a delivery device. Each delivery device includes a holder, such as a pizza bag, for holding the food product and a memory device, such as an RFID tag, for receiving and storing the order information read by the transfer station. The entry/exit station includes an RFID reader for reading the order information stored on the delivery device as it is carried out of a store for delivery and for transmitting the order information to the computing device for updating records related to the order.

In use, order information is typed into the register at the ordering station whenever a customer places an order for one or more food items. At least some of the order information is then written to the RFID tag located on one of the cars carried by the conveyor track by the RFID reader/writer at the ordering station. At the same time, the computing device receives this same order information and correlates the food products ordered with the exact type and quantity of ingredients and cooking instructions to fulfill the order. The computing device then creates food preparation instructions corresponding to this information. For example, if the ordered food product is a pizza, the food preparation instructions may include the type of pizza, each ingredient and weight of the ingredients comprising the pizza, and assembly and cooking instructions for the ingredients. The food preparation instructions are then written to the RFID tag on the car by the RFID reader/writer of the ordering station.

The car, armed with the order information and the food preparation instructions, then automatically proceeds to a food preparation station, at which time the RFID reader at the food preparation station reads the RFID tag on the car and displays on the video monitor located over the station the food preparation instructions relevant to that food preparation station. For example, the monitor may display the required food ingredients and quantities to be applied at the station. A weigh scale may be coupled with the car to sense that the proper amount of a food item has been applied to the food-supporting platform of the car. Once it has, the video monitor may prompt the food preparer to add another ingredient until the scale indicates that the proper amount of the ingredient has been added. The food preparer may then push a "complete" button or other input device to prompt the car to travel to the next station until the entire food order has been produced.

Once all of the required ingredients or food items have been added to the car to fulfill an order, the car and the carried food products are conveyed to the heating station or stations for heating and/or cooking. The car is then conveyed to the transfer station where the delivery information that still exists on the RFID tag attached to the car is read by the RFID reader at the transfer station. This RFID reader/writer in turn passes the information to another RFID reader/writer which writes the information to the RFID tag associated with the delivery device. A food preparer then removes the prepared food item from the car and places it in the food delivery device for delivery to the customer.

The order information stored on the delivery devices RFID tag preferably includes the time and date the food was prepared, to whom it is being delivered, the address to which it is being delivered, and any other information that the store operators wish to track. Once a food item has been removed from a car, the car continues on the track until it reaches the ordering station again so it may be used to handle another food order. The RFID tags on the conveyor cars and the delivery devices are read/write tags and thus are re-written after each use with information from the next food order.

The purpose of the entry/exit station is to record the date and time each delivery device leaves the food preparation area enroute to a customer and to record the date and time that the delivery device returns from the delivery. Because the RFID tag of each delivery device stores all desired order information, such as details of the order and the time and date that each food item in the delivery device was fully prepared, the store's central database can automatically record a full historical record of each order.

These and other important aspects of the present invention are described more fully in the below.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 1:
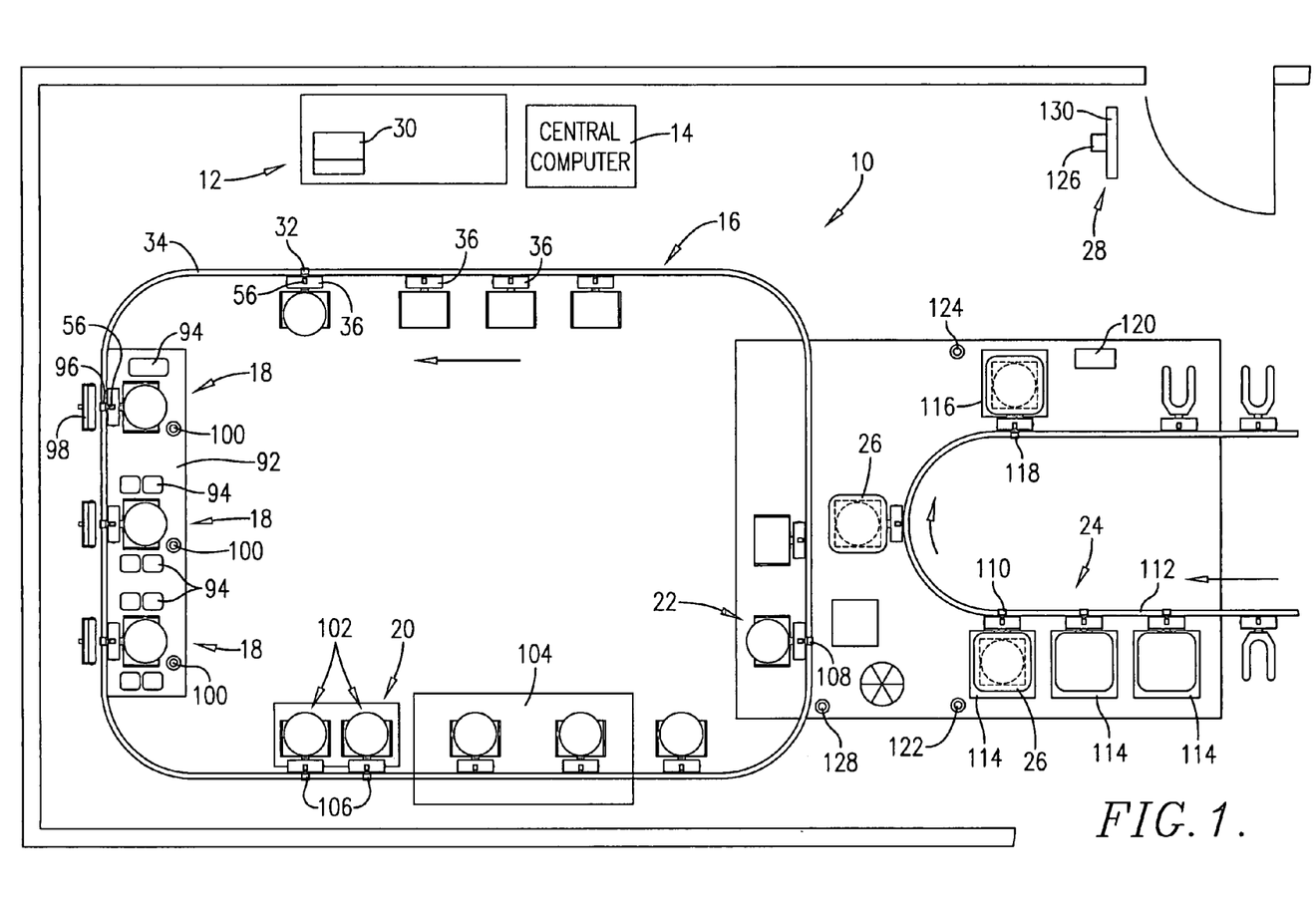
FIG. 1 is a plan view of a food preparation system constructed in accordance with a preferred embodiment of the present invention.

Turning now to the drawing figures, and particularly FIG. 1, a food preparation system 10 constructed in accordance with a preferred embodiment of the invention is illustrated. The food preparation system 10, and use thereof, partially automates the ordering, preparation, and delivery of food items to provide labor efficiencies and other efficiencies heretofore not found in restaurants and other food establishments. Use of the present invention also greatly reduces or even eliminates human mistakes and other errors in the ordering, preparation and delivery of food items.

A preferred embodiment of the food preparation system 10 is described and illustrated herein as being used in a pizza restaurant. However, those skilled in the art will appreciate that the food preparation system 10 may be used in any food establishment without departing from the scope of the present invention.

One embodiment of the food preparation system 10 broadly comprises an ordering or point-of-sale station 12; a computing device 14; a conveyor system 16; at least one food preparation station 18; at least one heating or cooking station 20; a transfer station 22; a delivery station 24 including at least one delivery device 26; and an entry/exit station 28.

The ordering station 12 is operated by a hostess, waitress or other attendant for taking food orders from customers. The order may be placed in-person, over the telephone, or by any other conventional means. The ordering station 12 preferably includes an electronic cash register 30 and an RFID reader/writer 32 coupled with the cash register via a wired or wireless connection. The cash register 30 may be any conventional register typically used in food establishments or other retail stores and is provided for inputting food orders in a conventional manner. Similarly, the RFID reader/writer 32 may be any conventional RFID device capable of writing information to and reading information from RFID tags. One example of an RFID reader/writer that may be used with the present invention is described in U.S. Pat. No. 6,320,169, hereby incorporated into the present application by reference. The RFID reader/writer 32 includes an RFID coupler and one or more RFID antennas.

The order information entered into the cash register 30 may include, for example, the quantity and type of ordered food products, the name and address of the customer to whom the food should be delivered, and the time and date of desired delivery. Other information that a restaurant wishes to track may also be entered.

The computing device 14 may be any device capable of receiving, storing, and processing data such as the order information entered into the cash register 30. The computing device 14 is preferably a central computer which can access, and is accessible by, the cash register 30, but it may also be integral with the cash register 30 or some other device within the food preparation system 10.

The computing device 14 preferably stores or has access to information concerning all of the required ingredients, required amounts of the ingredients, and cooking instructions for every type of food product that may be ordered from the food establishment in which the present invention is used. When order information is entered into the cash register 30, the computer 14 creates food preparation instructions related to the order. For example, if the order information indicates that a customer has ordered a pepperoni pizza, the computer 14 creates food preparation instructions which include a list and quantity of ingredients needed to make the pizza and the particular assembly and cooking instructions for the ingredients.

The conveyor system 16 broadly includes an elongated track 34 and a plurality of cars 36 movable along the track. The purpose of the conveyor system 16 is to carry a car 36 to the ordering station 12, through the food preparation and heating stations 18,20, and to the transfer station 22 so that a food order can be initially transferred to the car 36 and food items can be subsequently added to the car 36 to complete the food order so that it may be delivered to a customer. Once a fully prepared food item has been removed from a car 36, the conveyor system 16 returns the car to the ordering station 12 to fulfill another food order.

The track 34 is preferably formed by a continuous rail or other support that is mounted to a ceiling, wall or other support within the food establishment so as to carry the cars 36 to the ordering station 12, food preparation station 18, heating station 20 and transfer station 22. As best illustrated in FIGS. 2, 3 and 6, the rail 34 defines an upper track groove 38 and a lower track groove 40 for receiving wheels of the cars as described in more detail below.

The rail 34 also includes a pair of elongated, spaced apart power strips 42,44 which are connected to a suitable source of electricity. The power strips are preferably designed to carry low voltage electricity (preferably 14 volt) so as to minimize the risk of electrical shocks.

Figure 2:
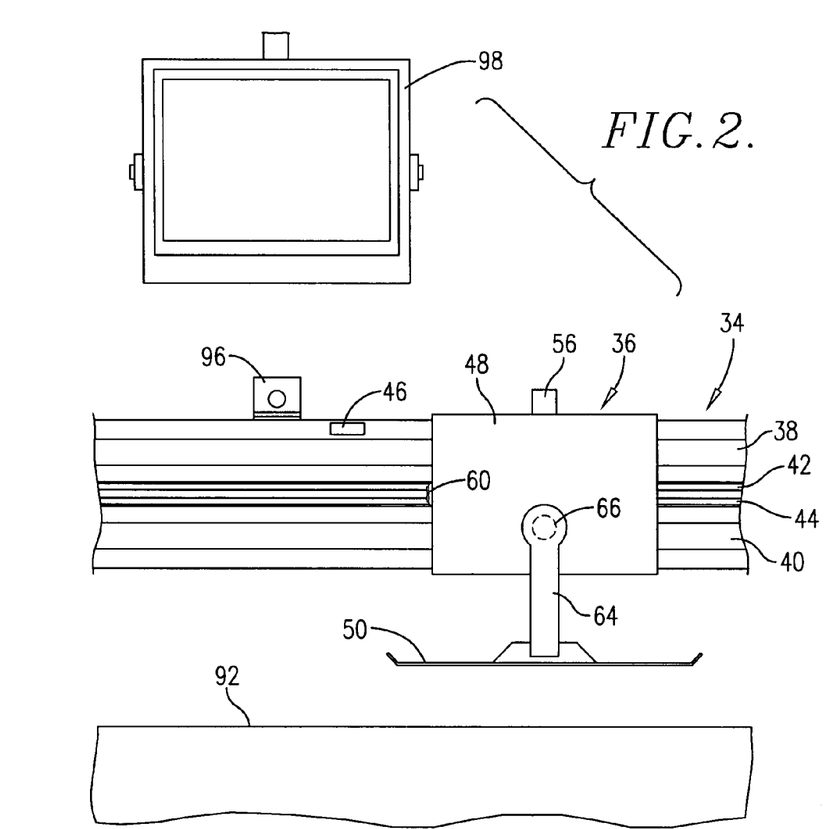
FIG. 2 is a fragmentary front elevational view of a portion of the food preparation system showing the conveyor system and one of the food preparation stations.
Figure 3:
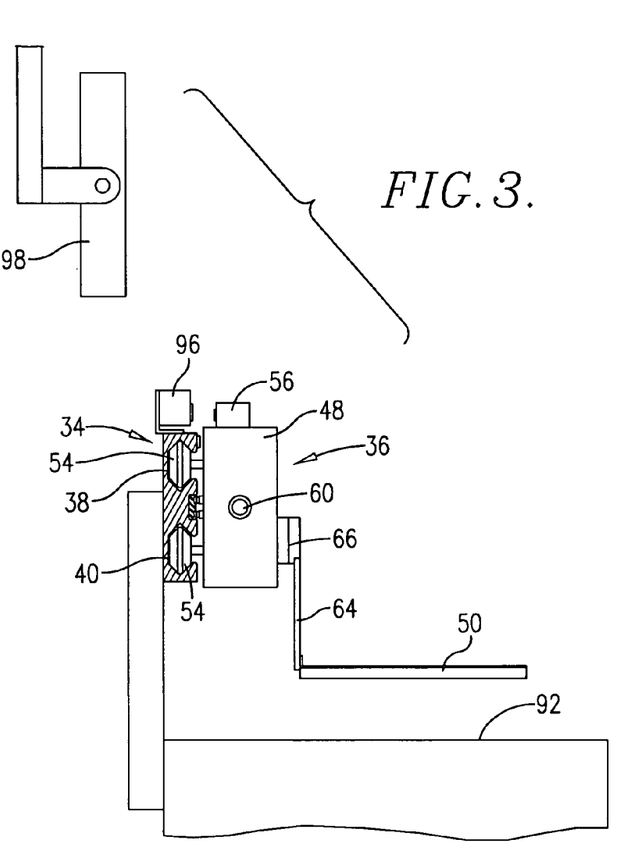
FIG. 3 is an end elevational view of the portions of the food preparation system shown in FIG. 2.
Figure 4:
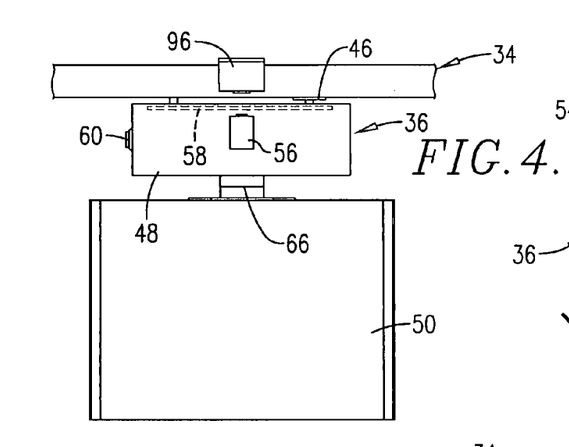
FIG. 4 is a fragmentary plan view of a portion of the conveyor system.
Figures 5, 6:
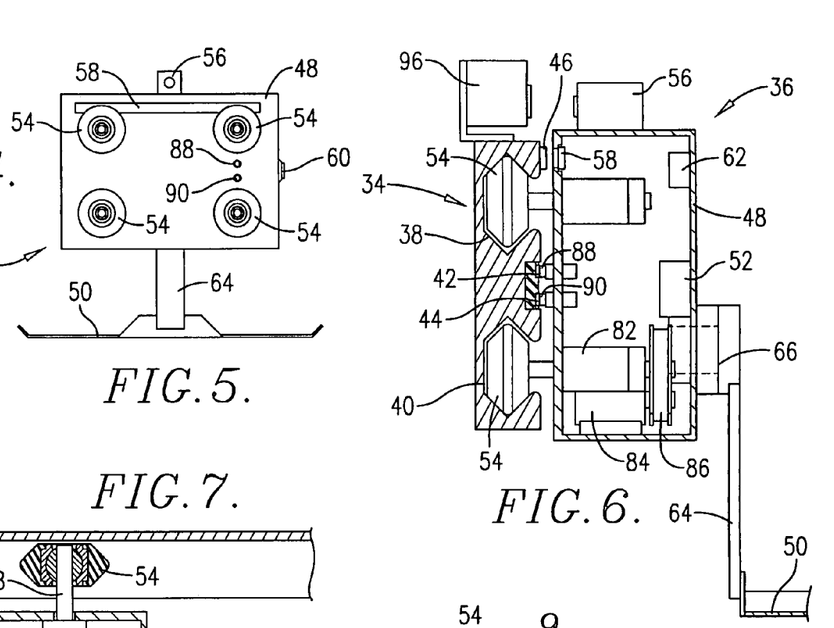
FIG. 5 is a rear elevational view of one of the cars of the conveyor system shown removed from its track.
FIG. 6 is a vertical sectional view of one of the cars and a portion of the track of the conveyor system.

As best illustrated in FIGS. 2, 4, and 6, a plurality of position-sensing devices 46 are mounted to the rail, or adjacent the rail, at specified locations to enable the cars 36 traveling along the rail to stop at these locations. Specifically, position-sensing devices 46 are mounted on or near the portions of the rail passing in front of the ordering station 12, each food preparation station 18, each heating or cooking station 20, and the transfer station 22. As described in more detail below, the position-sensing devices 46 interact with components carried on the cars for temporarily stopping the cars in front of desired stations. The preferred position-sensing devices are Sensopad™ resonator pucks which interact with Sensopad™ tracks mounted to the cars. The Sensopad™ components are sold by Sensopad™ Technologies Limited of Cambridge, England. However, other conventional position-sensing devices that perform the functions described herein may also be used.

As best illustrated in FIGS. 2-7, each car 36 preferably includes a chassis 48 or other main body, a food-supporting platform 50 depending from the chassis, a strain gauge 52, four wheels 54 extending from one side of the chassis, an RFID tag 56 or other memory device, a linear transducer 58, a proximity sensor 60, and an electronic switch 62.

The food-supporting platform 50 may be a tray or any other device capable of holding food items or vessels containing food items prepared by the food establishment. For example, if the food establishment is a pizza restaurant, the food-supporting platform 50 may be a tray sized to hold a conventional pizza pan. The food-supporting platform 50 is preferably supported to the chassis 48 by a pivot arm 64 which is in turn connected to the chassis 48 by a pivot assembly 66. The pivot arm 64 and pivot assembly 66 keep the food-supporting platform 50 level even if the track 34 includes vertically climbing or descending sections.

The strain gauge 52 is directly or indirectly coupled with the food-supporting platform 50 for sensing the weight of food products placed on the platform. The strain gauge 52 provides a signal to the RFID tag 56 on the car representative of the measured weight.

Figures 8, 9:
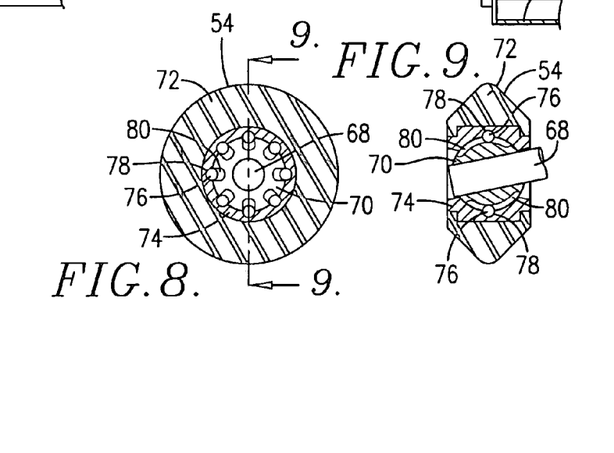
FIG. 8 is a vertical sectional view of one of the wheels of the car.
FIG. 9 is a sectional view of one of the wheels of the car taken along line 9-9 of FIG. 8.

As best illustrated in FIGS. 6, 8 and 9, the wheels 54 are positioned within the upper and lower track grooves 38,40 of the rail 34 and each include an axle 68, a spherical drive hub 70 attached to the axle 68, a tire 72, a driven hub 74 attached to the tire 72, and a plurality of drive balls 76 positioned within sockets 78 of the driven hub 74 and rotatable within drive grooves 80 formed in the spherical drive hub 70. The drive balls 76 are movable within the drive grooves 80 to permit the axle 68 to pivot relative to the tire 72 as shown in FIG. 9 so that the wheels 54 may independently follow the track when it turns corners or makes other changes in direction.

Figure 7:
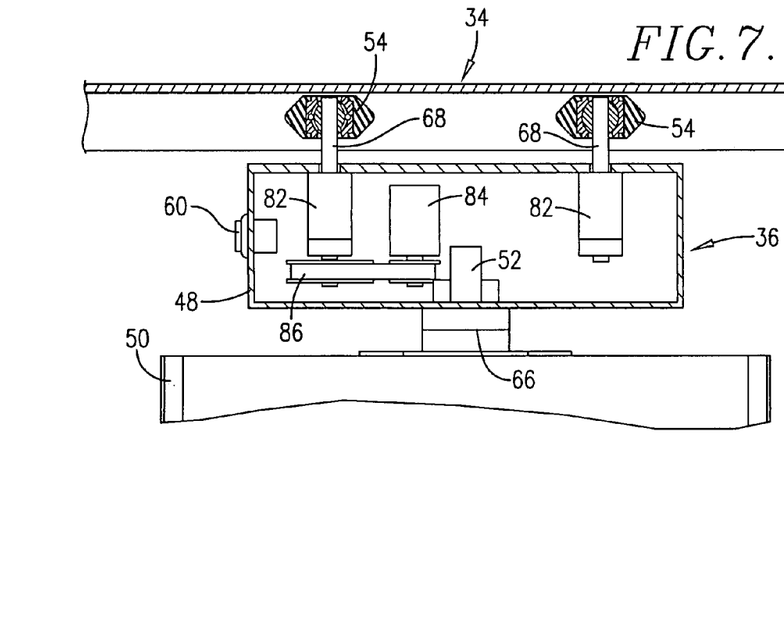
FIG. 7 is a horizontal sectional view of one of the cars and a portion of the track of the conveyor system.

As best illustrated in FIG. 7, the axles 68 are supported by wheel mount hubs 82 attached to the car chassis 48. At least one of the wheels is coupled to a drive motor 84 via a drive pulley and belt assembly 86 or other transfer mechanism. The drive motor is preferably a 14 volt high torque motor. The drive motor receives electricity from a pair of electrically conductive brushes 88,90 attached to the car chassis between two of the wheels 54.

The RFID tag 56 on each car is operable for receiving and storing at least some of the order information and the food preparation instructions from the RFID reader/writer 32 of the ordering station 12 and for transferring this information to RFID reader/writers adjacent the food preparation stations 18, heating stations 20 and transfer station 22 as described in more detail below. Each RFID tag 56 may be positioned anywhere on its car such as on top of the car's chassis as illustrated.

The linear transducer 58 on each car cooperates with the resonator pucks 46 on the conveyor track 34 in order to slow and then stop the cars at desired locations. The linear transducer is preferably a Sensopad™ track that measures its position relative to the Sensopad™ resonator pucks described above.

The proximity sensor 60 is preferably mounted on the forward-most edge of the car 36 as defined by the car's direction of travel and is provided for sensing when the car comes too close to another car on the track or another object blocking the track. The proximity sensor 60 may be an infrared sensor or any other conventional proximity sensor.

The electronic switch 62 is coupled with the drive motor 84 and receives input signals from both the linear transducer 58 and the proximity sensor 60. The electronic switch 62 controls the drive motor 84 so as to slow the car as it approaches a puck 46 and then stop the car in front of the various food preparation and heating stations. The electronic switch 62 also slows and eventually stops the car when the proximity sensor 60 senses that the car is too close to another car or other object on the conveyor track.

The food preparation stations 18 are provided for adding selected food items or ingredients to a car to fulfill a food order. The preferred food preparation system 10 includes a number of food preparation stations. For example, as shown in FIG. 1, an exemplary pizza restaurant may include three food preparation stations: one for adding pizza dough and tomato paste to a pizza pan; one for adding meat, vegetables or other toppings to the dough; and one for adding cheese to the toppings.

Each food preparation station 18 preferably includes a countertop 92 or other work surface, one or more food containers 94 positioned within or on top of the work surface, an RFID reader/writer 96 positioned on or near the track 34 adjacent the station, a video monitor 98 or other prompter, and a control button 100 or other input device. A resonator puck 46 is also positioned on the conveyor track adjacent each food preparation station as described above.

The work surface 92 and food containers 94 are entirely conventional and are provided for holding ingredients or food items and for providing work space for a food preparer working at the food preparation station. Refrigerators, cooling drawers, heating elements and other conventional devices may also be provided for cooling, heating or otherwise conditioning the food ingredients or food items held in the food containers.

The RFID reader/writer 96 at each food preparation station 18 is provided for reading at least some of the food preparation instructions from the RFID tag 56 of a car 36 as it stops at the station and then sending a signal representative of these instructions to the video monitor 98 or other prompter. The video monitor 98, which may be any conventional TV or computer monitor, then displays the food preparation instructions to prompt a food preparer at the food preparation station to add at least one ingredient or food item to the car in accordance the displayed food preparation instructions. For example, the video monitor 98 at the first food preparation station 18 may prompt a person to add pizza dough to a pan carried by the food-holding platform on a car, the video monitor at the second food preparation station may prompt a person to add tomato paste and desired toppings to the pan, and the video monitor at the third food preparation station may prompt a person to place cheese over the other ingredients on the pan.

Each control button 100 serves as a "complete" button that allows a food preparer to release a car from a particular food preparation station when all of the required ingredients have been added by the preparer. When pressed, the control button preferably sends a 300 ms, high intensity burst of 13.56 MHz energy from the RFID reader/writer's 96 antenna. The resultant magnetic field disrupts the AC magnetic field coupling between the Sensopad™ resonator 46 and Sensopad™ track 58, thus eliminating the output voltage signal that was being sent to the drive motor 84 to stop it.

The heating stations 20 are provided for heating and/or cooking the food items or food-holding vessels carried by the cars. The heating stations may consist of one or more induction cooktops, a conventional oven, and/or other conventional heating or cooking devices. The illustrated food preparation system includes a pair of induction heating stations 102 for preheating a pizza pan so that the crust of the pizza reaches a desired temperature as well as a conventional oven 104 for completing the cooking of the pizza on the pan.

The induction cooktops 102 may be RFID-equipped cooktops such as the ones described in U.S. Pat. Nos. 6,232,585 and 6,320,169, both incorporated herein by reference. The oven 104 may be a conventional pizza oven or any other type of oven used for cooking various food items.

A Sensopad™ resonator puck 46 is positioned along the track 34 at each of the induction cooktops 102 and at one or more positions adjacent the oven 104 for stopping the cars as described above. RFID reader/writers 106 and corresponding antennas are preferably positioned adjacent each of the resonator pucks. When a car reaches a position along the track adjacent one of the resonator pucks, the car stops and is heated by the induction heater or oven. When a heating cycle is complete as dictated by the food preparation instructions carried by the car and read by the appropriate RFID reader/writer 106, the RFID antenna sends a high intensity pulse as described above to disrupt the operation of the Sensopad™ resonator 46 and transducer 58 to permit the car to move on. The proximity sensor 60 on each car is also operable to prevent two cars from colliding on the induction heaters 102 or in the oven 104.

The transfer station 22 is provided for transferring the food items from the cars 36 to the delivery devices 26 on the delivery stations 24. The transfer station 22 includes an RFID reader/writer 108 for reading at least some of the order information from a car's RFID tag 56. The RFID reader/writer 108 is coupled with an RFID reader/writer 110 at the delivery station 24 for writing the order information read from the car to an RFID tag in one of the delivery devices 26. The transfer station also includes a resonator puck that causes the car to stop at the transfer station as described above.

Each delivery device 26 includes a holder, such as a pizza bag, for holding a food product delivered by a car and an RFID tag or other memory device attached to or embedded within the holder for receiving and storing the order information read from the car by the transfer station 22. Preferably, at least the following order information is read from the RFID tag on the car and transferred to the RFID tag in the delivery device: the customer's name, address, and telephone number; a description of the food item taken from the car and placed in the food holder (e.g., "large pepperoni pizza"); the time and date that the food item was placed in the delivery device; an order number for the food item; and an indication of other food items which must be combined with this food item to complete a particular order.

In addition to the delivery devices 26 and RFID reader/writer 110, the delivery station 24 includes a conveyor system 112 which carries the delivery devices over a series of induction cooktops 114 to warm the delivery devices before food is placed therein. The delivery station may also include a final induction cooktop 116 for maintaining the temperature of a delivery device after a pizza has been placed therein, another RFID reader/writer 118 for reading information from the RFID tag of a delivery device, a printer 120, and several "complete" buttons 122,124.

The entry/exit station 28 is provided for tracking: 1) when completed food orders are taken from the food establishment to complete an order process; and 2) when a delivery person returns with an empty delivery device. The entry/exit station includes an RFID reader/writer 126 coupled with the central computer 14 for reading the order information stored on the delivery device and for transmitting the order information to the central computer. The central computer then uses this information to update its order database.

Operation

Referring to FIG. 1, use of the food preparation system 10 is now described in connection with a pizza restaurant. A customer first orders a pizza in-person, over the telephone, or by way of other means. A worker at the ordering station 12 then enters the order in the electronic cash register 30. That order is relayed to the store's central computer 14 or other computing device, which then begins a database entry with all pertinent information from the order and the date and time that the order was placed. The central computer 14, in return, sends an indication of all of the ingredients, the amounts of the ingredients, and the preparation instructions back to the register 30 at least some of the order information and the preparation instructions are sent to the RFID reader/writer 32 via a wired or wireless connection so that the information can be written to the RFID tag 56 attached to a car by the RFID reader/writer 32. The car, with an empty pizza pan, has stopped adjacent the RFID reader/writer because its Sensopad™ track has interacted with the Sensopad™ puck attached to the track at this location, thus sending a voltage signal to the car motor's switch to shut the motor off. Other cars are queued up behind this car because their proximity sensors have temporarily shut down their motors.

After sending the above-described information to the car's RFID tag 56, the RFID reader/writer 32 at the ordering station sends a high intensity continuous signal from its antenna that disrupts the Sensopad™ system's communication and thus eliminates the voltage signal that is stopping the car's motor. Once free of that voltage signal, the car's motor resumes operation and the car moves forward on the conveyor track to the first of three food preparation stations.

Assuming that no other cars are in that position already (in which case the car's proximity sensor would temporarily shut down its motor until the blocking car moves), the car moves until its Sensopad™ track interacts with the Sensopad™ puck attached to the track directly across from the first food preparation station's RFID reader/writer 96. At this time, the car will stop when the Sensopad's™ voltage signal triggers the motor's switch to stop the motor.

Once the car 36 is at the food preparation station 18, the RFID reader/writer 96 at the station will read the car's RFID tag 56 and will pass the food preparation instructions on the tag to the display monitor 98. The display monitor may then simply display the food preparation instructions relevant to its food preparation station. Alternatively, the display monitor may be coupled with a compact disk (CD) player or other video player and associated electronics. The information read from the car's tag may be sent to the electronics, which access the proper address on a CD ROM queued in the CD player that holds a video with pictures of the proper ingredients and amounts of said ingredients to place on this particular pizza. It also may contain full instructions on how to do so in pictorial, audio, and written words.

Once the food preparer has completed the tasks for his or her food preparation station, the preparer pushes the "complete" button 100, which forces the RFID reader/writer 96 above the station to send a high intensity, long duration signal to disrupt the Sensopad™ communication and thus allows the car to move to the next food preparation station. At the second food preparation station, the car again "sees" the Sensopad™ puck and thus stops adjacent the station's RFID reader/writer. The video monitor at the second station then displays the food preparation instructions relevant to that station. Or, if the video monitor is equipped with a CD player as described above, the section of the CD ROM accessed will have the ingredients and directions that pertain to those ingredients and steps required at this particular preparation station.

Again, once the food preparer has completed the tasks for the second food preparation station, he or she pushes this station's complete button 100 to allow the car to move along to the third preparation station. In our example, this third preparation station completes the food preparation for the pizza prior to its cooking. For instance, the bin in this last food preparation station may have all of the toppings and/or cheese that this pizza store uses.

Once the third food preparer presses the "complete" button 100, the car with a completed but cold pizza pie moves to the heating and cooking station 20. If another car is already in position adjacent the RFID antenna of the first induction heating station 102, the car's proximity sensor will stop its motor before colliding with the other car. At this position, the induction cooktop at the heating station heats the pizza pan beneath the prepared but cold pizza in accordance with heating instructions stored in the car's RFID tag.

The two illustrated heating stations 102 may cooperate to heat a pizza pan for a prescribed amount of time. For example, if a pizza pan should be pre-heated for 20 seconds before entering the oven 104, a car carrying the pizza pan may travel directly to the second heating station to receive the full 20 seconds of heating if no other car is positioned at the second heating station. If, however, another car is already present at the second heating station, the car may stop at the first heating station for part or all of the 20-second interval and then travel to the second heating station for any remainder of the 20-second interval once the blocking car moves. This occurs because the car's proximity sensor no longer "sees" the blocking car and thus allows its motor to run again until the car's Sensopad™ track interacts with the Sensopad™ puck attached to the track adjacent the second heating station's RFID antenna. Thus, the first car will stop adjacent the RFID antenna of the second heating station so that its pizza pan is in position over the induction cooktop so as to be automatically heated for the remaining portion of the pre-heat cycle.

Once the car reaches the end of its 20 seconds of induction heating, the RFID reader/writer 106 sends a high intensity, long duration signal via its antenna so as to disrupt Sensopad™ communications and thus allow the car to proceed along the track to enter the pizza oven.

The travel speed of the car is precisely selected so that its travel through the pizza oven fully cooks the pizza. For example, if the temperature of the oven provides for complete cooking of a pizza in 10 minutes, the car's travel speed is selected to take 10 minutes to pass through the oven. The car's components are either made of high temperature materials or are insulated sufficiently by such so that the car can withstand its travel through the oven.

After the car has exited the oven, it continues to move until its Sensopad™ "sees" the puck adjacent the RFID reader/writer 108 of the transfer station 22. At this time, the RFID tag 56 on the car is read by the RFID reader/writer 108. The order information on the tag is then transferred to the RFID reader/writer 110 of the delivery station.

Adjacent the RFID reader/writer 110 is a car from the conveyor system of the delivery station 24. The delivery station which is used to sequentially heat the pizza bags or other delivery devices 26, continually move these fully heated pizza delivery bags to an attendant so that he can fill them with pizzas for orders, and then to move these filled bags to a delivery person for delivery. Each car on the conveyor system 112 of the delivery station 24 has support arms which carry an inductively heatable, RFID equipped pizza delivery bag as described in detail in the above-noted patents. One pizza bag is shown positioned over the last of three RFID-equipped induction cooktops 114. The pizza bag adjacent the RFID reader/writer 110 has been fully heated to its prescribed temperature and will be maintained at that temperature indefinitely while over the induction cooktop. In this example, the car at the transfer station 22 contains a pizza that is the first of two that was ordered by a customer. Thus, a preparation person removes the pizza from the car, cuts it, boxes it, and places it into the pizza bag 26 atop the induction cooktop 114. He will then press a "complete" button 128 to move the car along the conveyor track to return to the ordering station 12.

Once the second pizza of the customer's order moves into position adjacent the RFID reader/writer 108, the same process occurs. Once the preparation person cuts and boxes this pizza, he places it into the same pizza bag 26 that is still being maintained at proper temperature over the induction cooktop 114. Now that the order is complete, the preparation person presses the "complete" button 122 so as to allow the Sensopad™ interaction to be disrupted and to allow the filled pizza bag along until its Sensopad™ track sees the puck adjacent RFID reader/writer 118.

At this point, the car with the two pizzas inside a heated pizza bag stops over the final induction cooktop 116. The RFID reader/writer 118 then reads at least some of the information from the bag's RFID tag and prints out a slip of paper from its attached printer 120 that has the name, address, and phone number of the customer to whom this order is being delivered. This slip of paper is placed in a window on the pizza bag by the delivery person. After he removes the bag to begin his delivery run, he presses "complete" button 120 which allows the car to move down the track.

As the delivery person leaves the pizza store, he walks past a large RFID antenna 130 coupled to the reader/writer 126 of the exit/entry station 28. This RFID reader/writer 126 reads the information from the bag and passes this information to the central computer 14. The central computer adds a time and date stamp to this information and update the database entry for this order.

Although the invention has been described with reference to the preferred embodiment illustrated in the attached drawing figures, it is noted that equivalents may be employed and substitutions made herein without departing from the scope of the invention as recited in the claims. For example, although the invention has been described and illustrated herein as being used in a pizza restaurant, the concepts may be used equally well in other food establishments such as restaurants that serve grilled items such as hamburgers and eggs as discussed in the provisional application Ser. No. 60/571,885 mentioned above. Also, the cooking units and other devices described in this provisional application may be used with the concepts described in the present application. Furthermore, the tray or other food holder carried by the cars may be combined with the food delivery devices. The tray may be, for example, a tray that both holds the food items as they are being prepared and that delivers the prepared foods atop it to the customers in a fast food dining room. Furthermore, the Sensopad™ linear positioning system may be replaced by other well-known positioning systems such as a series of proximity sensors (such as infrared beams) that, when triggered in sequence, determine the location of the car and can be used to send a signal to its motor to stop the car.

Having thus described the preferred embodiment of the invention, what is claimed as new and desired to be protected by Letters Patent includes the following:

1. A food preparation system comprising:
   an ordering station for receiving order information from a customer relating to a food product;
   a computing device for receiving at least some of the order information from the ordering station and for creating food preparation instructions to be followed to prepare the food product;
   a conveyor system including a track and a plurality of cars movable along the track, each car including a food-supporting platform and a memory device operably coupled with each car and moveable therewith along said track, said memory device operable for receiving and storing at least some of the order information and at least some information related to said food preparation instructions,
   each of said cars being independently moveable along said track relative to the other cars; and
   at least one food preparation station to which the track carries the cars, the food preparation station including a stopping device to stop the movement of each car at the food preparation station, a reader for reading at least some of the information stored in the memory of each car, a prompter for prompting a person at the food preparation station to follow at least one food preparation instruction derived from the information read by said reader, and a selectively operable input device operated by the person at the food preparation station when the prompted food preparation instruction is completed, in order to release the car and allow the car to move from the station.

2. The food preparation system as set forth in claim 1, the track including—
   an elongated rail for mounting to a fixed support, the rail presenting an upper track groove and a lower track groove,
   a pair of elongated power strips positioned on the rail,
   at least one RFID reader/writer attached to or adjacent the rail near one of the stations for writing information to or reading information from the memory device on each car, and
   at least one resonator puck attached to or adjacent the rail near one of the stations.

3. The food preparation system as set forth in claim 1, each car further including—
   a plurality of wheels for positioning in the upper and lower track grooves of the track rail,
   a drive motor for driving the wheels along the upper and lower track grooves,
   a pair of electrically conductive brushes for contacting the power strips on the track and transferring electricity to the drive motor,
   a linear transducer for sensing when the car is adjacent the resonator puck, and
   said stopping device comprising control circuitry coupled with the linear transducer for disabling the drive motor when the linear transducer senses that each car is adjacent the resonator puck.

4. The food preparation system as set forth in claim 3, the wheels each including an axle, a spherical hub attached to the axle, a tire, a driven hub attached to the tire, a plurality of drive balls positioned in sockets of the driven hub and movable within drive grooves formed in the spherical hub.

5. The food preparation system as set forth in claim 1, each car further including a strain gauge coupled with the food-handling platform for sensing weight of food items placed on the platform.

6. The food preparation system as set forth in claim 1, each car further including a drive motor, said stopping device having a proximity sensor for sensing when the car approaches another object on the track and an electronic switch coupled with the proximity sensor for deactivating the drive motor.

7. The food preparation system as set forth in claim 1, each car further including a pivot arm attached to the food-handling platform for maintaining a level orientation of the food-handling platform regardless of the position of the car along the track.

8. The food preparation system as set forth in claim 1, wherein the information related to the ordered food item is stored on the memory device of each car with an RFID reader/writer at an ordering station.

9. The food preparation system as set forth in claim 8, wherein the memory device on each car is an RFID tag.

10. The food preparation system as set forth in claim 1, wherein the information related to the ordered food item is read from the memory device of each car with an RFID reader/writer at a food preparation station.

11. The food preparation system as set forth in claim 1, further including a heating station to which the track carries each car for heating the food item on the food supporting platform of each car.

12. The food preparation system as set forth in claim 1, further including a transfer station to which the track carries each car car, the transfer station including a reader for reading at least some of the order information from the memory on each car car.

13. The food preparation system as set forth in claim 1, further including a delivery station adjacent the transfer station for use in preparing the food item for delivery to the customer.

14. The food preparation system as set forth in claim 13, the delivery station including a delivery device including a holder for holding the food product and a memory device for receiving and storing at least some of the order information read by the transfer station.

15. The food preparation system as set forth in claim 1, further including an entry/exit station including a reader for reading at least some of the order information stored on the memory device of the delivery device and for transmitting the order information to the computing device.

* * * * *